United States Patent [19]

Tortorello

[11] 4,289,595
[45] Sep. 15, 1981

[54] AMBIENT TEMPERATURE CURING PHOTOPOLYMERIZABLE EPOXIDE COMPOSITIONS UTILIZING EPOXIDE ETHERS AND METHODS

[75] Inventor: Anthony J. Tortorello, Elmhurst, Ill.

[73] Assignee: American Can Company, Greenwich, Conn.

[21] Appl. No.: 97,399

[22] Filed: Nov. 26, 1979

[51] Int. Cl.$^3$ ............................................. C08G 59/68
[52] U.S. Cl. .......................... 204/159.11; 204/159.18;
528/89; 528/90; 528/91; 528/93; 528/361;
528/408; 528/409
[58] Field of Search ...................... 204/159.11, 159.18;
528/408, 409, 89, 90, 91, 93, 361

[56] References Cited

U.S. PATENT DOCUMENTS

| | | | |
|---|---|---|---|
| 2,807,648 | 9/1957 | Pitt | 260/607 |
| 3,721,616 | 3/1973 | Watt | 204/159.11 |
| 3,721,617 | 3/1973 | Watt | 204/159.11 |
| 3,817,845 | 6/1974 | Feinberg | 204/159.11 |
| 3,829,369 | 8/1974 | Feinberg | 204/159.11 |
| 3,936,557 | 2/1976 | Watt | 428/211 |
| 3,968,056 | 7/1976 | Bolon et al. | 252/514 |
| 3,981,897 | 9/1976 | Crivello | 260/440 |
| 4,026,705 | 5/1977 | Crivello et al. | 96/27 R |
| 4,058,400 | 11/1977 | Crivello | 96/86 P |
| 4,058,401 | 11/1977 | Crivello | 96/115 R |
| 4,069,054 | 1/1978 | Smith | 96/115 P |
| 4,069,056 | 1/1978 | Crivello | 96/115 P |
| 4,081,276 | 3/1978 | Crivello | 96/35.1 |
| 4,090,936 | 5/1978 | Barton | 204/159.18 |
| 4,108,747 | 8/1978 | Crivello | 204/159.18 |
| 4,138,255 | 2/1979 | Crivello | 96/35.1 |
| 4,139,385 | 2/1979 | Crivello | 96/35.1 |
| 4,150,988 | 4/1979 | Crivello | 96/35.1 |

OTHER PUBLICATIONS

Crivello et al., "Photoinitiated Cationic Polymerization Using Diaryl Iodonium Salts," Jour. Radiation Curing 4, 2-11 (1977).

Primary Examiner—Earl A. Nielsen
Attorney, Agent, or Firm—Robert P. Auber; George P. Ziehmer; Stuart S. Bowie

[57] ABSTRACT

Photopolymerizable epoxide compositions are provided which contain photoinitiators decomposable upon exposure to electromagnetic radiation to produce a Lewis acid and polymerizable epoxide compounds including an epoxide ether compound having the following general structural formula:

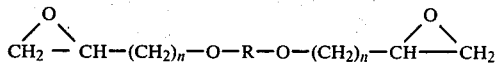

wherein n equals 1–3 and wherein R is an aliphatic or cycloaliphatic group having 5–12 carbon atoms. Other epoxide compounds may be used in combination therewith to provide compositions which cure rapidly to a tack-free condition at ambient temperatures. Specific epoxide ethers disclosed are those in which n=1 and R is a group selected from the class of 2,2-dimethylpropane, 2-ethyl-1,3-hexane, 1,4-dimethylcyclohexane and 1,10-decane.

10 Claims, No Drawings

AMBIENT TEMPERATURE CURING PHOTOPOLYMERIZABLE EPOXIDE COMPOSITIONS UTILIZING EPOXIDE ETHERS AND METHODS

BACKGROUND OF THE INVENTION

For a number of years the coating industry has been engaged in substantial developmental programs in the quest for procedures which would allow the coating of substrates at high production rates with the coating being cured to a tack-free condition at a speed commensurate with the contiguous processing steps. The industry has desired to eliminate the volatile solvents required in many of the well-known coating processes because of potential hazards or because of the cost of equipment to handle the evolved solvent vapors. In addition, the industry has been seeking coating formulations which would produce coatings which were durable and which would permit substantial additional processing of the workpiece, such as metal forming operations where the substrate is metal strip for container bodies, blanks and closures, or where plastic strip and paperboard are coated and formed.

Epoxy coating formulations have long been recognized as affording desirable properties in the finished coating, especially the toughness to withstand further processing. However, the problem has remained to develop a low cost epoxy coating formulation which would combine the desired rheological properties for the coating application with both reasonable pot life and rapid curing in the production line.

In Schlesinger U.S. Pat. No. 3,708,296 granted Jan. 2, 1973, there are disclosed photopolymerizable epoxide formulations containing diazonium salts as photoinitiators which polymerize rapidly upon exposure to electromagnetic radiation to provide durable coatings.

In Watt U.S. Pat. No. 3,794,576 granted Feb. 26, 1974, there are described desirable epoxy formulations which combine the desired rheological properties with suitable pot life and rapid curing at ambient temperatures, by incorporation of a photoinitiator and at least about 15 percent by weight of an epoxidic ester having two epoxycycloalkyl groups.

Since the disclosures of Schlesinger and Watt, a number of patents and publications have appeared proposing various onium salt photoinitiators for the epoxy formulations which could replace the diazonium catalysts specifically described in the Schlesinger and Watt Patents. Among these are the sulfonium and other Group VIa salt catalysts disclosed in Smith U.S. Pat. No. 4,069,054 granted Jan. 17, 1978; Barton U.S. Pat. No. 4,090,936 granted May 23, 1978; and Crivello U.S. Pat. Nos. 4,069,055 granted Jan. 17, 1978 and 4,058,401 granted Nov. 15, 1977. Other onium salt catalysts are described in Crivello U.S. Pat. Nos. 4,069,054 granted Jan. 17, 1978 and 3,981,897 granted Sept. 21, 1976; and UV CURING: SCIENCE AND TECHNOLOGY, edited by S. P. Pappas et al (Technology Marketing Corporation, Stamford, Conn.).

Use of sulfonium catalysts in combination with epoxide formulations containing the epoxycycloalkyl esters of the aforementioned Watt Patent is now being advocated commercially by various companies to provide systems with good storage and ambient temperature curing characteristics. More recently, it has been suggested that epoxide formulations which do not contain the relatively expensive epoxycycloalkyl esters of the Watt patent may be cured rapidly upon exposure to electromagnetic radiation by maintenance of the epoxide formulation at a controlled elevated temperature for a short period of time after exposure.

However, there has continued a search for other epoxide compounds which would provide the highly desirable rapid, ambient temperature curing characteristics to photopolymerizable epoxide compositions to provide durable commercial coatings. As will be appreciated, such compositions must exhibit shelf stability, acceptable rheological properties, and good physical properties for the finished coating as well as rapid ambient temperature curing properties. Moreover, desirably the monomer cost should be relatively economical.

Accordingly, it is an object of the present invention to provide novel photopolymerizable compositions containing epoxidic ether compounds which may be cured at ambient temperatures.

It is also an object to provide such compositions which are relatively stable during extended periods of storage and which will nevertheless polymerize rapidly to produce coatings with desirable mechanical properties.

Another object is to provide a novel polymerization process using such compositions and which is adaptable to a wide variety of high speed coating lines and which does not require extensive or expensive equipment to effect polymerization of the applied coating.

SUMMARY OF THE INVENTION

It has now been found that the foregoing and related objects may be readily attained by photopolymerizable epoxide compositions containing 55–99.9 percent by weight of polymerizable epoxide compounds and wherein at least 25 percent by weight of the epoxide compounds comprise epoxide ether compounds having the following structural formula:

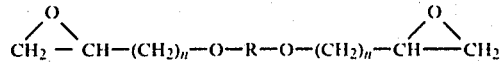

wherein n equals 1–3 and wherein R is an aliphatic or cycloaliphatic group having 5–12 carbon atoms. The compositions additionally include at least 0.1 percent by weight of a photoinitiator soluble in the epoxide compounds and decomposable upon exposure to electromagnetic radiation to provide a Lewis acid to initiate polymerization of the epoxide compounds. These compositions are curable to a tack-free condition at ambient temperature upon exposure to electromagnetic radiation for a period of 0.5 second to 60 seconds.

Especially useful as the epoxide ether compounds of the present invention are those wherein n equals 1 and wherein R is a group selected from the class comprising 2-ethyl-1,3-hexane, 2,2-dimethylpropane, 1,4-dimethylcyclohexane and 1,10-decane. Highly desirable photoinitiators comprise sulfonium salt photoinitiators and diazonium salt photoinitiators. Preferably, the epoxide ether compounds comprise at least 40 percent by weight of the polymerizable epoxide compounds.

As will be readily appreciated, photopolymerizable compositions produced by admixing the cationically polymerizable epoxide compounds described above with the photoinitiators are subsequently exposed to electromagnetic radiation at ambient temperatures to decompose the photoinitiator to generate a Lewis acid which initiates polymerization of the polymerizable epoxide materials. This exposure to radiation produces polymerization of the composition to a tack-free condition within a period of less than 60 seconds. The photopolymerizable composition is desirably applied to a substrate as a coating before the step of exposure to the electromagnetic radiation.

DETAILED DESCRIPTION OF THE PREFERRED EMBODIMENTS

The epoxide ether compounds utilized in the compositions and methods of the present invention are diglycidyl ethers having a chain length which has been found to provide the ambient temperature curing characteristics, flexibility in the cured coatings and satisfactory rheological properties for the compositions to enable use in coating applications. All compounds falling within the following general formula tested to date demonstrate a satisfactory balance of these properties, in some instances by themselves and in other instances in combination with other epoxide compounds:

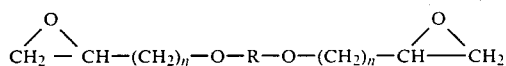

wherein n equals 1–3, and wherein R is an aliphatic or cycloaliphatic group having 5–12 carbon atoms.

The preferred compounds are those wherein n equals 1, and wherein the R group is selected from the class comprised of 2-ethyl-1,3-hexane, 2,2-dimethylpropane, 1,4-dimethylcyclohexane and 1,10-decane. The carbon chain length separating the glycidyl ether groups appears to be critical to achieving the desired ambient temperature curing properties while obtaining useful rheological properties for commercial applications.

These compounds are conveniently prepared in a two-stage synthesis. In the first step, the appropriate diol is condensed with 2 equivalents of epichlorohydrin or its homolog in the presence of a suitable catalyst such as anhydrous stannic chloride:

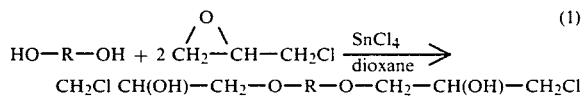

In the second step, hydrogen chloride is eliminated to form the glycidyl ether:

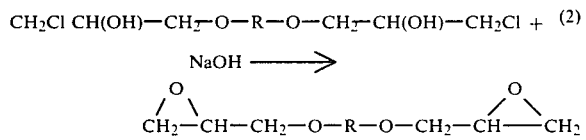

Unfortunately, the reaction mechanism, while simple, does not produce a high level of conversion to the desired end product. It is believed that chlorine-containing oligomers result from the following kinetic competition of the primary hydroxyl group of the diol, and both the primary and secondary hydroxyl groups of the monochlorohydrin.

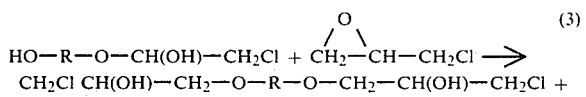

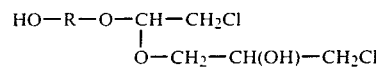

As a result, the product of the abstraction reaction is a mixture of the desired ether, a monoglycidyl ether and oligomeric chlorine-containing glycidyl ethers.

Various separation techniques may be employed. Conveniently, the suspended solids which are produced in the abstraction reaction may be dissolved in water by admixing the mixture from that reaction with water. The organic solvent (dioxane is conveniently employed) is removed by flash evaporation, and the aqueous mixture is then extracted repeatedly with ether. The ether extracts are combined and washed with water, and may also be washed subsequently with dilute hydrochloric acid and water. The ether extract is then dried and concentrated. Differential distillation or fractionation may be employed to separate the desired product from other components.

The diglycidyl ethers used in the present invention provide ambient temperature curing characteristics to epoxide formulations when they comprise at least about 25 percent, and preferably at least about 40 percent, of the polymerizable epoxide compounds in the composition. They may comprise the sole polymerizable epoxide compound, and they may be used in combination either with other epoxide ether compounds of the foregoing structural formula or with other types of epoxide compounds to provide the desired ambient temperature curing characteristics together with acceptable rheological properties and desirable physical properties in the polymer. However, an optimum balance of curing, rheological and physical properties is generally obtained by admixtures of the epoxide ethers of the foregoing formula with other types of polymerizable epoxide compounds including the cycloaliphatic epoxy esters of the aforementioned Watt Patent.

It will be appreciated that the compositions of the present invention do not require solvents for obtaining the desired rheological properties and generally solvents should not be included to avoid having solvent venting and recovery equipment in the apparatus or installations where polymerization of the composition is effected.

Other cationically polymerizable materials may be used in combination with the epoxide prepolymer materials, but the epoxides must comprise the principal polymerizable constituent. Such vinyl organic monomers include vinylidene aromatic hydrocarbons such as styrene; vinylethers such as isobutyl vinylether and n-octyl vinylether; acrolein; vinylarenes such as 1-vinylpyrene and acenaphthalene; vinyl cycloaliphatics such as vinyl cyclohexane; conjugated dienes such as isobutylene, butadiene and isoprene. In addition, cyclic ethers such as oxetanes and oxolanes, e.g., tetrahydrofuran and trioxane, may be employed. Other groups of compounds comprise the cyclic esters such as the beta-lactones, e.g., propiolactones; and cyclic amines such as 1,3,3-trimethyl azetidine. Another class of cationically polymerizable materials comprises cyclic organosilicon compounds such as hexamethyl trisiloxane. Still another class of materials which can be used comprises thermosetting organic condensation resins of an aldehyde such as urea/formaldehyde resins, phenol/formaldehyde resins, melamine/formaldehyde resins, and the like, as described in Crivello U.S. Pat. No. 4,102,687 granted July 15, 1978.

Moreover, the cationically polymerizable materials may be prepolymers or low molecular weight polymers, either of the vinyl family or of the epoxy family. Vinyl prepolymers include multifunctional vinylethers and low molecular weight diene polymers.

Suitable cationically polymerizable materials are described at length in Pappas, "UV CURING: SCIENCE AND TECHNOLOGY," (Technology Marketing Corporation, Stamford, Conn.); Crivello U.S. Pat. Nos. 4,150,988; Crivello 4,102,687; and Crivello 4,069,056.

As previously indicated, the polymerizable materials are comprised at least principally of epoxide prepolymer materials. In addition to the required epoxide ether compounds of the present invention in the specified minimum percentage and which may be used in combination, other types of epoxide compounds may be employed in combination therewith. These may comprise any monomeric or oligomeric material containing at least one functional epoxy group or oxirane ring so that they may be polymerized upon opening of the oxirane ring. In addition, polymeric epoxy materials may be employed if they may be dispersed in the composition and are capable of undergoing further polymerization to produce a solid polymer. The epoxy compounds may be aliphatic, cycloaliphatic, aromatic or heterocyclic. The epoxidic prepolymer should contain no functional groups more basic than the oxirane ring and should be a solvent for the initiator. Most desirably, the prepolymer should contain a reasonable percentage of epoxy compounds containing two or more epoxy groups per molecule.

The polymerizable epoxy compounds will have an average epoxide value of about 0.1–1.0. The carbon chains having the epoxy groups may include additional substituents including ethers, esters, halogens, phosphates, and the like, and the compounds may include other polymerizable functional groups such as acrylates and silicones.

Typical epoxy materials which may be used in combination with the epoxide ether compounds of the present invention are readily available commercially, the most common being those which are the product of bisphenol A with epicholorohydrin or those resulting from the reaction of epichlorohydrin with a phenol/formaldehyde resin of relatively low molecular weight. Reference may be made to the HANDBOOK OF EPOXY RESINS by H. Lee and K. Neville (McGraw-Hill 1967) for various epoxides. In addition, the technical literature and patent literature both contain extensive discussions of various epoxidic prepolymer materials which are useful in the compositions of the present invention as will be demonstrated hereinafter.

In the aforementioned Watt U.S. Pat. No. 3,794,576, there are described radiation-sensitive epoxidic blends containing at least about 15 percent by weight of an epoxidic ester having at least two epoxycycloalkyl groups per molecule in order to achieve rapid polymerization and curing of the composition at ambient temperatures upon exposure to ultraviolet radiation or the like. Such compounds are conveniently esters of an epoxidized cyclic alcohol and an epoxidized cycloalkanecarboxylic acid or esters of an alkyl-substituted (epoxycycloalkane)methanol and a dibasic acid. A number of suitable compounds are disclosed in the aforementioned Watt Patent. Such esters may be used in combination with the epoxide ethers of the present invention to provide highly advantageous compositions which exhibit a desirable balance of properties.

Although not essential and sometimes undesirable, the polymerizable epoxy composition may contain diluents to improve viscosity, and these diluents may be reactive such as those produced by reaction of an alcohol or a phenol with epicholorohydrin. Exemplary of reactive diluents is the reaction product of nonylphenol with epichlorohydrin. The amount of diluent may vary from zero to as much as 45 percent of the polymerizable material if a reactive diluent is employed and is preferably less than 15 percent if nonreactive diluents such as dibutylphthalate are employed.

For some applications, the composition may contain an inert pigment or dye to provide a desired coloration. Generally, such pigments and dyes will comprise less than about 45 percent by weight of the composition. For certain applications, it may be desired to include an inert filler such as talc or silica where such fillers will not adversely affect the desired properties for the cured composition. They will normally comprise less than 45 percent by weight and preferably less than 25 percent by weight of the polymerizable composition.

The polymerizable material may also include minor amounts of a free radical polymerizable material such as the acrylate monomers as described in claimed in Tsao et al U.S. Pat. No. 4,156,035, granted May 22, 1979. Such acrylate monomers include multifunctional acrylate and methacrylate materials such as trimethylol propene triacrylate, ethylene glycol diacrylate, diethylene glycol diacrylate and the corresponding methacrylates. When such polymerizable acrylate monomers are employed, they should comprise less than 50 percent by weight of the polymerizable material and preferably less than 25 percent by weight.

The photoinitiator may be any one of the many onium salts which have been disclosed in the aforementioned Schlesinger, Watt, Crivello and Smith Patents. Specifically, diazonium salts such as the aromatic diazonium salts of complex anions as described in Watt U.S. Pat. No. 3,794,576 granted Feb. 26, 1974 and Schlesinger U.S. Pat. No. 3,708,296 granted Jan. 2, 1973 may be employed. Exemplary are such compounds as p-nitrobenzenediazonium hexafluorophosphate, p-chlorobenzenediazonium phosphate, 2,4-dichlorobenzenediazonium tetrafluoroborate, and p-methoxybenzenediazonium tetrafluoroborate.

The onium salts of Group V and Group VIa elements are disclosed in Crivello U.S. Pat. Nos. 4,069,055 granted Jan. 17, 1978, 4,058,401 granted Nov. 15, 1977, 4,069,,054 granted Jan. 17, 1978 and 3,981,897 granted Sept. 21, 1976; Smith U.S. Pat. No. 4,069,054 granted Jan. 17, 1978; Barton U.S. Pat. No. 4,090,936 granted May 23, 1978; and UV CURING: SCIENCE AND TECHNOLOGY. Exemplary of such initiators are diphenyliodonium tetrafluoroborate, di-(2,4-dichlorophenyl) iodonium hexafluorophosphate, diphenyliodonium hexafluorophosphate, diphenyliodonium hexafluoroarsenate, triphenylsulfonium hexafluorophosphate, tris(4-phenoxyphenyl)sulfonium hexafluorophosphate, and trifluoromethyldiphenylsulfonium tetrafluoroborate.

Other types of photoinitiators may also be employed so long as they are soluble in the polymerizable epoxide compounds, stable until exposed to electromagnetic radiation and effective to produce the desired Lewis acid to polymerize the epoxide compounds. Of the various types of photoinitiators, the complex sulfonium salts and the complex diazonium salts are preferred.

The amount of the photoinitiator may vary within a fairly wide range of 0.1–10 percent by weight of the composition, recognizing that at least about 0.1 percent by weight, based upon the polymerizable material, is generally necessary to initiate polymerization. To effect polymerization rapidly, the amount should comprise at least about 0.5 percent by weight of the polymerizable material. Although amounts of up to 5 percent by weight provide increasing reaction rate, amounts thereabove provide no significant additional benefit in reaction rate and ten to deleteriously affect the physical properties of the polymer produced. Thus, a practical upper limit for the photoinitiator is 10 percent by weight, based upon the weight of polymerizable material; the preferred range is 0.5–4.0 percent.

The term "Lewis acid" as used herein is intended to encompass compounds produced by decomposition of the photoinitiator and which will directly or indirectly receive an electron pair from the monomer to initiate polymerization, as, for example, from the oxygen of the oxirane ring to open the oxirane ring. The classic Lewis Acid precursor decomposition mechanism is described in the aforementioned Watt U.S. Pat. No. 3,794,576 with respect to a diazonium initiator. As is well known, the term "Lewis acid" in its broad scope includes protonic or Brønsted acids.

The decomposition mechanism for triarylsulfonium salts to provide an indirectly formed Lewis Acid has been postulated by Crivello et al in "Triarylsulfonium Salts: A New Class of Photoinitiators for Cationic Polymerization" in JOURNAL OF RADIATION CURING, Vol. 5, page 2 (January 1978). The authors postulate that the decomposition of the triarylsulfonium salts produce a Brønsted acid which in turn provides a proton which will function as the Lewis Acid to accept electrons from an oxygen of an oxirane ring in an epoxide monomer and initiate polymerization in accordance with the following mechanism, as shown in equations (1)–(3):

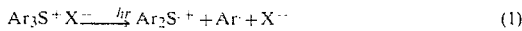

(1)

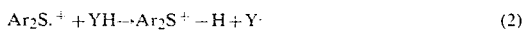

(2)

(3)

Regardless of the theory of the action embraced, it is apparent that the photoinitiator is decomposing to generate in the reaction medium an electron acceptor acting as a Lewis acid to open an oxirane ring in an epoxide compound or otherwise accepting an electron pair from other cationically polymerizable monomers and thereby initiating cationic polymerization of the monomer material. The reaction then proceeds as additional monomer units are activated until all of the monomer has been polymerized or until impurities interfere with the reaction mechanism.

As indicated, the photoinitiator is decomposed into a Lewis acid by exposure to electromagnetic radiation. Although electron beam bombardment, X-ray radiation, and other similar forms of high energy radiation may be employed for this purpose, exposure to ultraviolet radiation has been found highly satisfactory and is desirable for commercial applications. The exposure to radiation normally required may be of extremely short duration, periods of about one to ten seconds being normally adequate for most compositions depending upon the intensity of the radiation at the surface. However, for relatively thick deposits of the composition, it may be desirable to extend the period of exposure to fifteen seconds or even more, to ensure adequate penetration of the radiation through the depth of the coating.

The compositions of the present invention are particularly useful for making durable coatings for either aesthetic or protective purposes. Epoxy compositions find particular advantage in the field of graphic arts because of the resistance of the coating to solvents and chemicals as well as to abrasion, because of the excellent adhesion to various surfaces including metals, and because of the ability to withstand drawing and forming operations.

Illustrative of the efficacy of the present invention are the following specific examples wherein all parts are parts by weight unless otherwise indicated.

EXAMPLE ONE

Into a 1000 ml. round bottom flask were placed 26.0 g. neopentyl glycol, 600 ml. dioxane, and 5 ml. anhydrous stannic chloride. The mixture was warmed to 60° C. to dissolve the solids and 40.4 ml. epichlorohydrin were added dropwise while the mixture was maintained at this temperature. The mixture was stirred for 4 hours and then cooled to ambient temperature by an external water bath. To the cooled solution were added 21 g. sodium hydroxide pellets, and the mixture was stirred for 15 hours.

The resultant mixture had a large amount of white solids suspended in solution and was poured into 200 ml. water to dissolve the solids. The solution was flash evaporated to remove the dioxane, and the remaining solution was extracted four times with 150 ml. portions of ether. The ether extracts were combined and washed with three 200 ml. portions of cold water, 100 ml. of dilute hydrochloric acid (10%) and finally with another 200 ml. portion of cold water. The extract was dried with magnesium sulfate and concentrated to a slightly yellow clear liquid. The distillation from sodium carbonate produced 18.38 g. (34% yield) of a colorless liquid having a boiling point of 80°–130° C.

The compound thus produced was designated 1,3-bis(2,3-epoxypropoxy)-2,2-dimethyl propane. This compound corresponds to the general structural formula presented hereinbefore wherein n is equal to 1 and R is 2,2-dimethylpropane.

EXAMPLE TWO

Into a 500 ml. flask were placed 250 ml. dioxane, 14.6 g. 2-ethyl-1,3-hexanediol, and 2 ml. anhydrous stannic chloride. The mixture was heated to 50° C. and 19.4 ml. epichlorohydrin were added dropwise over a period of 30 minutes. The mixture was maintained at 55°–60° C. for 3 hours and then cooled to ambient temperature by an external water bath. When cooled, there were added 9.2 g. sodium hydroxide pellets, and the mixture was stirred for 15 hours.

The mixture containing suspended solids was poured into 250 ml. water to dissolve the solids and the dioxane was then flash evaporated. The mixture was extracted with four 150 ml. portions of ether, and the ether extracts were combined and washed with several 150 ml. portions of dilute hydrochloric acid (10%). The organic layer was then dried with magnesium sulfate and concentrated to 12.2 g. (47% yield) of a slightly yellow liquid.

Distillation from sodium carbonate gave three fractions before the residue polymerized in the flask. The fractions had boiling points of 105°–130° C., 130°–132° C. and 136°–142° C. The highest boiling point fraction was found to be comprised substantially of the desired product and weighed 8.27 g. (32% yield).

This product was designated 1,3-bis(2,3-epoxypropoxy)-2-ethyl-1,3-hexane and corresponds to the general structure wherein n=1 and R is 2-ethyl-1,3-hexane.

EXAMPLE THREE

Into a 1000 ml. flask were placed 400 ml. dioxane and 2 ml. anhydrous stannic chloride. The mixture was warmed to 60° C. and there were then added thereto 28.8 g. 1,4-cyclohexanedimethanol and an additional 100 ml. dioxane. The mixture was stirred at 60° C. for 30 minutes, and 41.6 g. epichlorohydrin were then added thereto in dropwise fashion. This mixture was stirred for 15 hours.

The solution was cooled to ambient temperature and admixed with 200 ml. water, following which the dioxane was flash evaporated. The remaining aqueous solution was extracted with four 100 ml. portions of ether, and the ether extracts were combined and washed several times with a brine solution. The ether extract was then dried with magnesium sulfate and concentrated to a slightly yellow liquid.

Into a 500 ml. flask were placed 16 g. sodium hydroxide pellets and 250 ml. dioxane. To this mixture were added in a dropwise fashion over a period of 30 minutes 63.3 g. of the product of the above reaction. The mixture became cloudy white and stirring was continued for a period of 15 hours.

The mixture was poured into 250 ml. water to dissolve the solids and the dioxane was removed by flash evaporation. The solution was extracted several times with ether. The ether extracts were combined, washed four times with cold water, dried with magnesium sulfate and concentrated to a colorless clear liquid. Thin layer chromatography indicated a two-component mixture. Distillation yielded a clear liquid having a boiling point of 128°–132° C.

The compound was designated 1,4-bis[(2,3-epoxypropoxy)methyl]-cyclohexane and corresponds to the general structural formula wherein n=1 and R is 1,4-dimethylcyclohexane.

EXAMPLE FOUR

Into a 500 ml. flask were placed 200 ml. dioxane and 1 ml. anhydrous stannic chloride, and the mixture was stirred at 40°–50° C. to dissolve the solids. To this mixture were added 17.4 g. 1,10-decanediol, and the solids were dissolved by warming the solution at 60°–70° C. for 45 minutes. To this solution was added dropwise at 70° C. a solution of 23.1 g. epichlorohydrin in 50 ml. dioxane. The mixture was stirred for an additional 2 hours at 70° C.

The resultant clear yellow solution was cooled to room temperature and poured into 400 ml. water. The dioxane was removed by flash evaporation, and the aqueous solution was then extracted with three 100 ml. portions of ether. The extracts were combined, dried over magnesium sulfate, and concentrated to a slightly yellow viscous liquid. Thin layer chromatography indicated only one major component.

Into a 1000 ml. flask were placed 9.5 g. sodium hydroxide pellets and 500 ml. dioxane. To this mixture was added dropwise a solution of 36.4 g. of the above reaction product in 50 ml. dioxane. The mixture was stirred for 15 hours, and then poured into 200 ml. water. The dioxane was removed by flash evaporation, and the aqueous mixture was extracted with four 100 ml. portions of ether. The ether extracts were combined, washed with three 100 ml. portions of cold water, dried with magnesium sulfate and concentrated to a slightly yellow liquid. Distillation indicated a boiling point of 80° C. and the distillate solidified in the condenser and was found to have a melting point of 32° C.

The product was designated 1,10-decamethylenedioxy-bis-(2,3-epoxypropane) and corresponds to the foregoing general formula wherein n=1 and R is 1,10-decane.

EXAMPLE FIVE

To test the curability of the epoxide ether compound produced in Example One, a photopolymerizable compositions was prepared containing 97 parts of the epoxide, 2 parts p-methoxybenzenediazonium hexafluorophosphate as the photoinitiator and 1 part silicone resin flow agent (sold under the designation SR-82 by General Electric). For comparison purposes, a control formulation using 98 parts of a cycloaliphatic epoxide ester of the aforementioned Watt Patent was prepared, the specific ester being 3,4-epoxy cyclohexylmethyl-3,4-cyclohexane carboxylate (sold under the designation CY-179 by Ciba-Geigy) and the amount of the catalyst being only 1 part.

The formulations were coated onto tin-free steel test panels with a No. 3 wire wound rod, and the panels were exposed to an ultraviolet light source (67 watts/inch) at a distance of 3 inches. The coating was considered to be cured if it was tack-free upon removal from the light source. The cured panels were given a short post-bake treatment at 340° F. for 9 minutes to facilitate coating flow out and relaxation of the polymer. The baked panels were formed into can ends, which were then immersed in copper sulfate solution to determine the extent of coating failure through observation of the copper deposition. The performance of each coating was rated on an arbitrary scale of 1 to 10 with 1 being optimum. In addition to cure speed and fabrication performance, the relative viscosities of the several formulations were determined by measuring the time necessary for 1.0 ml. of the composition to flow from a 1.0 ml. volumetric pipette. The results are set forth in the following table.

| Monomer | Cure rate, sec. | End Fabrication | Viscosity, sec. |
|---|---|---|---|
| Example One | 20 | 7 | 30 |
| CY-179 | 5 | 8 | 1334 |

From this data it can be seen that the epoxide ether of the present invention provides a coating formulation which has a considerably lower viscosity and improved fabrication characteristics although with a slower cure rate.

EXAMPLE SIX

To evaluate the benefits which might be obtained by admixing the epoxide ether compounds of the present invention with the cycloaliphatic epoxide esters of the Watt Patent, two test compositions were prepared using 98 parts polymerizable epoxide materials comprised of 60% by weight of the epoxide ester of Example Five and 40% of the epoxide ethers respectively of Examples One and Two, together with 1 part each of the catalyst and flow agent of Example Five. The test procedures for determining cure rate and fabrication characteristics are as described above and the test results are set forth in the following table.

| ETHER | CURE RATE, SEC. | END FABRICATION |
|---|---|---|
| Example One | 5 | 3 |
| Example Two | 5 | 2 |
| Control (No ether) | 5 | 8 |

Thus, it can be seen that the mixtures of the two types of epoxide materials offer significant benefits in terms of fast cure rate at ambient temperature and greatly improved fabrication characteristics.

EXAMPLE SEVEN

In a procedure similar to that set forth in Example Five, the epoxide ethers of Examples Three and Four were evaluated for cure rate and viscosity using 2 parts of the catalyst as compared with a control using the epoxide ester (CY-179) and only 1 part of the catalyst. The control formulation cured tack-free after 5 seconds whereas the formulations containing the epoxide ethers each required 10 seconds exposure. The composition containing the epoxide ether of Example Three exhibited a relative viscosity of 155 and that of Example Four exhibited a viscosity of 64 as compared with a viscosity of 1334 for the control. Both formulations using the epoxide ethers showed greatly improved flexibility over the control formulation.

Mixtures of each of the two epoxide ethers with the epoxide ester in the manner described in Example Six produced compositions with fast cure rates and fabrication characteristics which were improved over the control formulation.

Thus, it can be seen from the foregoing detailed specification and examples that there are provided photopolymerizable epoxide compositions which will cure relatively rapidly at ambient temperatures and which provide improved rheology. The coatings produced therefrom exhibit desirable fabrication characteristics such as flexibility. Methods using these formulations are simple and effective and readily adapted to high speed coating and fabrication lines.

Having thus described the invention, I claim:

1. A photopolymerizable epoxide comprising:
   A. 50–99.9 percent by weight polymerizable epoxide compounds, at least 25 percent by weight of such epoxide compounds being an epoxide ether compound selected from the group consisting of 1,4-bis[(2,3-epoxypropoxy)methyl]-cyclohexane and 1,10-decamethylenedioxy-bis-(2,3-epoxypropane); and
   B. At least 0.1 percent by weight of a photoinitiator soluble in said epoxide compounds and decomposable upon exposure to electromagnetic radiation to provide a Lewis acid to initiate polymerization of said epoxide compounds, said composition being curable to a tack-free condition at ambient temperatures upon exposure to electromagnetic radiation for a period of 0.5 to 60 seconds.

2. The composition of claim 1 wherein said photoinitiator is a sulfonium salt photoinitiator.

3. The composition of claim 1 wherein said photoinitiator is a diazonium salt photoinitiator.

4. The composition of claim 1 wherein said epoxide ether compound comprises at least 40 percent by weight of the polymerizable epoxide compounds.

5. The composition of claim 1 wherein said epoxide compounds include an epoxidic ester having at least two epoxycycloalkyl groups per molecule.

6. In the method of cationic polymerization of an epoxide formulation, the steps comprising:
   A. admixing 50–99.9 percent by weight of cationically polymerizable epoxide compounds with at least 0.1 percent by weight of a photoinitiator soluble therein, said photoinitiator being decomposable upon exposure to electromagnetic radiation to provide a Lewis acid to initiate polymerization of said cationically polymerizable epoxide compounds to form a photopolymerizable composition, said cationically polymerizable compounds being comprised of at least 25 percent by weight of an epoxide ether compound selected from the group consisting of 1,4-bis[2,3-epoxypropoxy)methyl]-cyclohexane and 1,10-decamethylenedioxy-bis-(2,3-epoxypropane); and
   B. exposing said photopolymerizable composition to electromagnetic radiation at ambient temperatures to decompose said photoinitiator to generate a Lewis acid to initiate polymerization of said polymerizable epoxide materials, said exposure producing polymerization of said composition to a tack-free condition within a period of less than 60 seconds.

7. The method of claim 6 wherein said photopolymerizable composition is applied to a substrate as a coating prior to said step of exposure to electromagnetic radiation.

8. The method of claim 6 wherein said epoxide ether compound comprises at least 40 percent by weight of the polymerizable epoxide compounds.

9. The method of claim 6 wherein said photoinitiator is a sulfonium salt photoinitiator.

10. The method of claim 6 wherein said photoinitiator is a diazonium salt photoinitiator.

* * * * *